US012614404B2

(12) United States Patent
Jha et al.

(10) Patent No.: US 12,614,404 B2
(45) Date of Patent: Apr. 28, 2026

(54) METHOD AND SYSTEM FOR PREPROCESSING DIGITAL DOCUMENTS FOR DATA EXTRACTION

(71) Applicant: Dell Products L.P., Round Rock, TX (US)

(72) Inventors: Saurabh Jha, Bangalore (IN); Adya Jha, Dhanbad (IN); Guhesh Swaminathan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 17/871,546

(22) Filed: Jul. 22, 2022

(65) Prior Publication Data

US 2024/0029462 A1     Jan. 25, 2024

(51) Int. Cl.
*G06V 30/41* (2022.01)
*G06V 10/20* (2022.01)

(52) U.S. Cl.
CPC .............. *G06V 30/41* (2022.01); *G06V 10/20* (2022.01)

(58) Field of Classification Search
CPC ........ G06V 30/41; G06V 10/20; G06V 10/82; G06V 30/19113; G06V 30/416
See application file for complete search history.

(56) References Cited

U.S. PATENT DOCUMENTS 11,232,298 B1 * 1/2022 Abraham ............... G06V 10/40
2014/0379301 A1 12/2014 Shastri

| 2016/0063064 | A1 |   | 3/2016 | Tanikawa |  |
|---|---|---|---|---|---|
| 2016/0307130 | A1 |   | 10/2016 | Naganathan |  |
| 2017/0230392 | A1 |   | 8/2017 | Dean |  |
| 2018/0219888 | A1 |   | 8/2018 | Apostolopoulos |  |
| 2020/0134083 | A1 |   | 4/2020 | Elliman |  |
| 2021/0012102 | A1 | * | 1/2021 | Cristescu ............. | G06F 40/284 |
| 2021/0027250 | A1 |   | 1/2021 | Lyerly |  |
| 2021/0089425 | A1 |   | 3/2021 | Lavi |  |
| 2022/0035993 | A1 |   | 2/2022 | Bhandarkar et al. |  |
| 2022/0156488 | A1 | * | 5/2022 | Mokhtari ............. | G06F 40/284 |
| 2022/0156490 | A1 |   | 5/2022 | Matiukhov |  |
| 2022/0318492 | A1 | * | 10/2022 | Gohari ................. | G06F 40/194 |
| 2022/0398397 | A1 | * | 12/2022 | Gangadhar ....... | G06F 18/24765 |
| 2023/0052372 | A1 |   | 2/2023 | Wilson et al. |  |
| 2023/0273610 | A1 |   | 8/2023 | Anand |  |
| 2023/0334885 | A1 | * | 10/2023 | Krishnamurthy .... | G06V 30/148 |

FOREIGN PATENT DOCUMENTS

WO            2022159063 A1     7/2022

* cited by examiner

*Primary Examiner* — Phuong H Nguyen
(74) *Attorney, Agent, or Firm* — Chamberlain, Hrdlicka, White, Williams & Aughtry; Aly Z. Dossa

(57)            ABSTRACT

Techniques described herein relate to a method for performing preprocessing of documents for data extraction. The method includes obtaining a document preprocessing request; in response to obtaining a document preprocessing request: obtaining a document associated with the document preprocessing request; performing data preparation on the document to generate an updated document; generating a document type prediction using the updated document and a document type prediction model; identifying a data extraction service of a plurality of data extraction services associated with the document type prediction; and initiating further processing of the document to perform data extraction using the identified data extraction service.

17 Claims, 6 Drawing Sheets

METHOD AND SYSTEM FOR PREPROCESSING DIGITAL DOCUMENTS FOR DATA EXTRACTION

BACKGROUND

Computing devices may provide services. To provide the services, the computing devices may require data included in documents. To obtain the data from the documents, the computing devices may extract the data from the documents. The documents may include multiple types of documents. Each type of document may include different types of data. Different methods of data extraction may be used to perform data extraction for each of the different type of documents.

SUMMARY

In general, certain embodiments described herein relate to a method for performing preprocessing of documents for data extraction. The method may include obtaining a document preprocessing request; in response to obtaining a document preprocessing request: obtaining a document associated with the document preprocessing request; performing data preparation on the document to generate an updated document; generating a document type prediction using the updated document and a document type prediction model; identifying a data extraction service of a plurality of data extraction services associated with the document type prediction; and initiating further processing of the document to perform data extraction using the identified data extraction service.

In general, certain embodiments described herein relate to a system for performing state management services for composed information handling systems. The system include clients and a document preprocessing engine. The document preprocessing engine is configured to obtain a document preprocessing request from a client of the clients; in response to obtaining a document preprocessing request: obtain a document associated with the document preprocessing request; perform data preparation on the document to generate an updated document; generate a document type prediction using the updated document and a document type prediction model; identify a data extraction service of a plurality of data extraction services associated with the document type prediction; and initiate further processing of the document to perform data extraction using the identified data extraction service.

In general, certain embodiments described herein relate to a non-transitory computer readable medium that includes computer readable program code, which when executed by a computer processor enables the computer processor to perform a method for performing preprocessing of documents for data extraction. The method may include obtaining a document preprocessing request; in response to obtaining a document preprocessing request: obtaining a document associated with the document preprocessing request; performing data preparation on the document to generate an updated document; generating a document type prediction using the updated document and a document type prediction model; identifying a data extraction service of a plurality of data extraction services associated with the document type prediction; and initiating further processing of the document to perform data extraction using the identified data extraction service.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1:
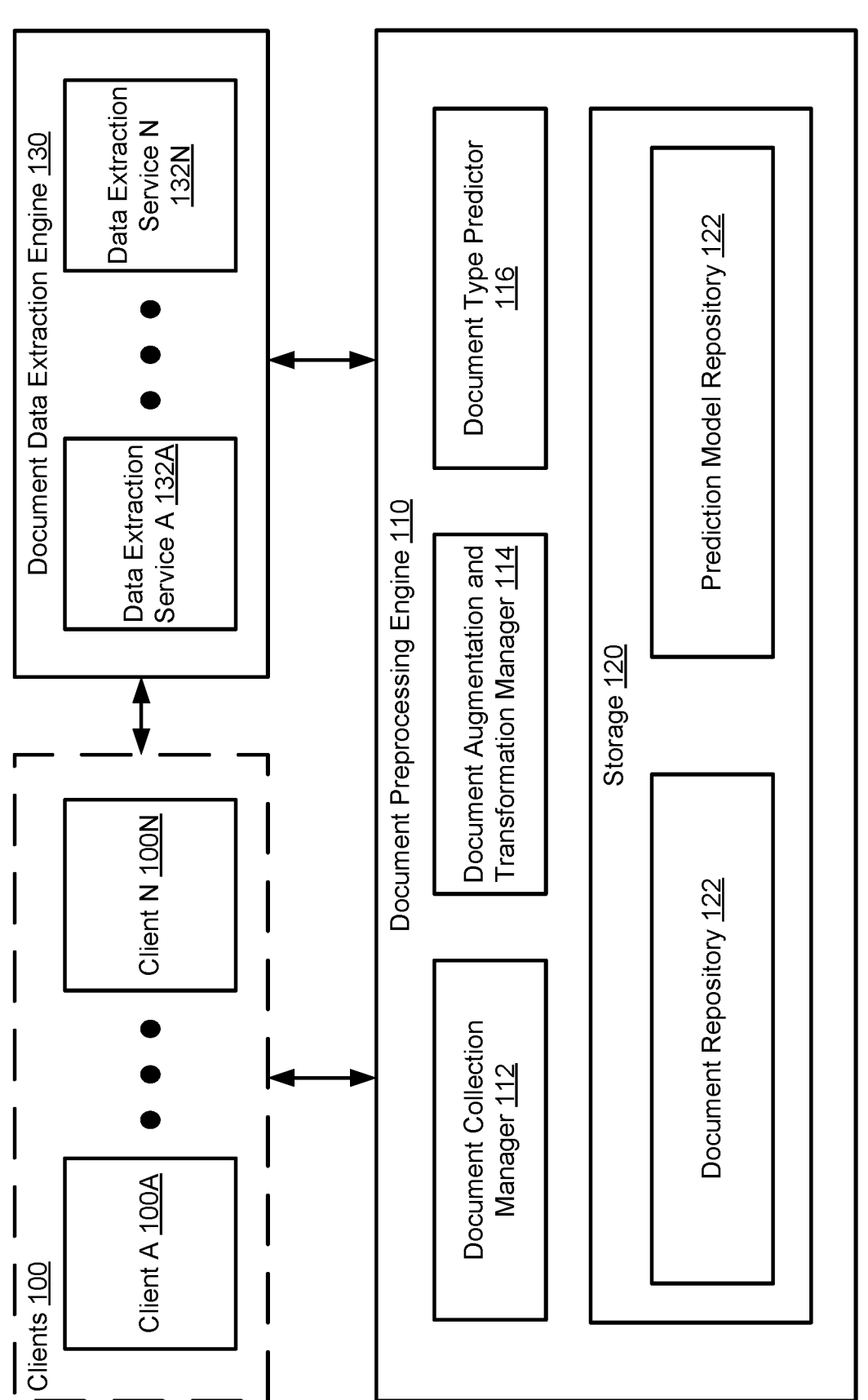
FIG. 1 shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, non-transitory computer readable mediums, and methods for performing document preprocessing services for documents.

In one or more embodiments, traditional document data extraction systems may perform data extraction for multiple types of documents. Simple classification algorithms may not be able to consistently and accurately classify document types of constantly varying layouts, contents, and/or configurations for each type of documents. Additionally, each type of document may require a different data extraction service to accurately perform data extraction. Therefore, such systems may utilize users (e.g., system administrators, data scientists, etc.) to manually segregate documents based on document types, and feed documents to the appropriate data extraction service based on the corresponding document type. Such manual document separation and feeding to appropriate data extraction services may require a significant amount of users' time to handle large quantities of documents. Additionally, manual document preprocessing may be susceptible to human errors.

To address, at least in part, the aforementioned document preprocessing issues, embodiments disclosed herein provide document preprocessing services. Specifically, a system in accordance with embodiments disclosed herein may generate updated training data by performing augmentation and transformation of training documents to improve the training of a document type prediction model. The augmented and transformed training data may be used to generate the document type prediction model using a deep learning algorithm. To perform document preprocessing, a document may be similarly augmented and transformed and applied to the document type prediction model to generate a document type prediction. The document type prediction may be used to identify the appropriate data extraction service to use to perform data extraction. As a result, efficiency and accuracy of document preprocessing and data extraction services may be improved.

FIG. 1 shows a diagram of a system in accordance with one or more embodiments disclosed herein. The system may include clients (100) that obtain document preprocessing services from a document preprocessing engine (110). The document preprocessing services may include training and using a prediction model to automatically generate document type predictions for documents obtained from the clients (100) in order to provide the documents to the appropriate data extraction service (e.g., 132A, 132N) of the document data extraction engine (130) to perform data extraction, additional analysis, and/or actions using the documents.

The components of the system illustrated in FIG. 1 may be operably connected to each other and/or operably connected to other entities (not shown) via any combination of wired and/or wireless networks. Each component of the system illustrated in FIG. 1 is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2B. The clients (100) may be implemented using other types of computing devices without departing from the embodiments disclosed herein. For additional details regarding computing devices, refer to FIG. 4.

The clients (100) may be implemented using logical devices without departing from embodiments disclosed herein. For example, the clients (100) may include virtual machines that utilize computing resources of any number of physical computing devices to provide the functionality of the clients (100). The clients (100) may be implemented using other types of logical devices without departing from the embodiments disclosed herein.

In one or more embodiments, the clients (100) include the functionality to and/or are otherwise configured to perform computer implemented services. The computer implemented services may include, for example, purchase order processing, inventory management, accounting services, etc. The computer implemented services may include using information obtained from documents such as purchase orders, inventory lists, accounting forms, etc. Therefore, the clients (100) may include the functionality to provide the documents to the document preprocessing engine (110) for document preprocessing services from the document preprocessing engine (110) and data extraction services from the document data extraction engine (130) prior to performing the computer implemented services using the documents. Otherwise, users of the clients (100) may be required to manually perform document segregation to appropriately perform data extraction on various types of documents which, with large quantities of documents, may require a lot of manual time and be susceptible to human error.

In one or more embodiments, as discussed above, the clients (100) may utilize data preprocessing services provided by the document preprocessing engine (110) and data extraction prediction services provided by the document data extraction engine (130). Using the data extraction prediction services may enable the clients (100) to avoid inefficient use of computing and/or manual resources to perform data extraction of documents required by the clients (100) to perform the computer implemented services.

To use the document preprocessing services and the data extraction prediction services, the clients (100) may perform actions under the directions of the document preprocessing engine (110) and the document data extraction engine (130). By doing so, the document preprocessing engine (110) and the document data extraction engine (130) may orchestrate the transmission of data (e.g., documents, document type predictions, data extraction predictions, etc.) and/or actions between the document preprocessing engine (110), the document data extraction engine (130), and the clients (100).

For example, a client (100) may send documents to the document preprocessing engine (110). The document preprocessing engine (110) may generate prediction models that may generate document type predictions that specify the document types associated with the documents of a client (100) (or other third party entity not illustrated in the system of FIG. 1). The document preprocessing engine may then provide the documents to the appropriate data extraction service (e.g., 132A, 132N) of the document data extraction engine (130) which may perform data extraction on the documents. The document data extraction engine (130) may then provide the documents and the extracted data to the clients (100) for further processing and/or to perform computer implemented services using the documents.

A system in accordance with one or more embodiments disclosed herein may include any number of clients (e.g., 100A, 100N) without departing from embodiments disclosed herein. For example, a system may include a single client (e.g., client A (100A)) or multiple clients (e.g., client A (100A) and client N (100N)).

In one or more embodiments, the document preprocessing engine (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the document preprocessing engine (110) described herein and/or all, or a portion, of the methods illustrated in FIGS. 2A-2B. The document preprocessing engine (110) may be implemented using other types of computing devices without departing from the embodiments disclosed herein. For additional details regarding computing devices, refer to FIG. 4.

The document preprocessing engine (110) may be implemented using logical devices without departing from the embodiments disclosed herein. For example, the document preprocessing engine (110) may include virtual machines that utilize computing resources of any number of physical computing devices to provide the functionality of the document preprocessing engine (110). The document preprocessing engine (110) may be implemented using other types of logical devices without departing from the embodiments disclosed herein.

In one or more embodiments, the document preprocessing engine (110) may include the functionality to, or otherwise be configured to, provide document preprocessing services. The document preprocessing services may include generating prediction models. The document preprocessing services may further include generating, using the prediction models, document type predictions. The document preprocessing services may also include initiating data extraction of the documents based on the predicted document type via the appropriate data extraction service (e.g., 132A, 132N). By doing so, the document preprocessing engine (110) may improve the efficiency and accuracy of separating documents based on document types to perform the appropriate data extraction services on documents as required by clients (100) for further processing. The document preprocessing engine (110) may include the functionality to perform other and/or additional services without departing from embodiments disclosed herein. For additional information regarding the functionality of the document preprocessing engine (110), refer to FIGS. 2A-2B.

To perform the data extraction prediction services, the document preprocessing engine may include a document collection manager (112), a document augmentation and transformation manager (114), a document type predictor (116), and a storage (120). The document preprocessing engine (110) may include other, additional, and/or fewer components without departing from embodiments disclosed herein. Each of the aforementioned components of the document preprocessing engine (110) is discussed below.

In one or more embodiments disclosed herein, the document collection manager (112) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the document collection manager (112) described throughout this Detailed Description.

In one or more embodiments disclosed herein, the document collection manager (112) is implemented as computer instructions, e.g., computer code, stored on a persistent storage that when executed by a processor of the document preprocessing engine (110) causes the document preprocessing engine (110) to provide the functionality of the document collection manager (112) described throughout this Detailed Description.

In one or more embodiments, the document collection manager (112) includes the functionality to, or is otherwise configured to, obtain and manage documents. The document collection manager (112) may request and/or obtain documents that require data extraction prediction services from the clients (100) or other entities not illustrated in the system of FIG. 1. The document collection manager (112) may include the functionality to store the documents in the storage (120) (e.g., in the document repository (122), discussed below). The document collection manager (112) may further include the functionality to store training documents obtained from the clients (100) and/or a third party entity not shown the system of FIG. 1 in the storage (120) (e.g., in the document repository (122), discussed below). The document collection manager (112) may include the functionality to perform all, or a portion thereof, the steps in the methods depicted in FIGS. 2A-2B. The document collection manager (112) may include or be configured to perform other and/or additional functionalities without departing from embodiments disclosed herein. For additional information regarding the functionality of the document collection manager (112), refer to FIGS. 2A-2B.

In one or more embodiments disclosed herein, the document augmentation and transformation manager (114) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the document augmentation and transformation manager (114) described throughout this Detailed Description.

In one or more embodiments disclosed herein, the document augmentation and transformation manager (114) is implemented as computer instructions, e.g., computer code, stored on a persistent storage that when executed by a processor of the document preprocessing engine (110) causes the document preprocessing engine (110) to provide the functionality of the document augmentation and transformation manager (114) described throughout this Detailed Description.

In one or more embodiments, the document augmentation and transformation manager (114) includes the functionality to, or is otherwise configured to, perform augmentation and transformation on documents to improve prediction model generation and document type prediction generation. The document augmentation and transformation manager (114) may include the functionality to perform all, or a portion thereof, the steps in the methods depicted in FIGS. 2A-2B. The document augmentation and transformation manager (114) may include or be configured to perform other and/or additional functionalities without departing from embodiments disclosed herein. For additional information regarding the functionality of the document augmentation and transformation manager (114), refer to FIGS. 2A-2B.

In one or more embodiments disclosed herein, the document type predictor (116) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the document type predictor (116) described throughout this Detailed Description.

In one or more embodiments disclosed herein, the document type predictor (116) is implemented as computer instructions, e.g., computer code, stored on a persistent storage that when executed by a processor of the document preprocessing engine (110) causes the document preprocessing engine (110) to provide the functionality of the document type predictor (116) described throughout this Detailed Description.

In one or more embodiments, the document type predictor (116) includes the functionality to, or is otherwise configured to, generate prediction models and document type predictions using the prediction models. The document type predictor (116) may include the functionality to perform all, or a portion thereof, the steps in the methods depicted in FIGS. 2A-2B. The document type predictor (116) may include or be configured to perform other and/or additional functionalities without departing from embodiments disclosed herein. For additional information regarding the functionality of the document type predictor (116), refer to FIGS. 2A-2B.

In one or more embodiments, the storage (120) may be implemented using one or more volatile or non-volatile storages or any combination thereof. The storage (120) may include the functionality to, or otherwise be configured to, store information that may be used by the data preprocessing engine (110) and the components thereof (e.g., 112, 114, 116) to perform data extraction prediction services for documents of clients (100). The information stored in the storage (120) may include a document repository (122) and a prediction model repository (124). The storage (120) may store other and/or additional information without departing from embodiments disclosed herein. Each of the aforementioned types of information stored in the storage (120) is discussed below.

In one or more embodiments, the document repository (122) may include one or more data structures that include documents. The documents may include documents obtained and stored to be used by the document preprocessing engine (110) for document preprocessing services. The documents may include any quantity of documents to be used by the document processing engine (110) for document preprocessing services without departing from embodiments disclosed herein. The documents may include, for example, purchase orders, inventory forms, job applications, accounting sheets, etc. The documents may include any type of documents that require data preprocessing for data extraction and further processing by the clients (100) without departing from embodiments disclosed herein. The document repository (122) may also include document metadata. The document metadata may include information associated with the documents. The information associated with the documents may include a document identifier, a client identifier associated with a corresponding client (e.g., 100A) that provided the document and/or that may use the document for further processing, a creation timestamp, etc. The document metadata may include other and/or additional information associated with the documents without departing from embodiments disclosed herein.

In one or more embodiments, the document repository (122) may also include training documents obtained from the clients (100) and/or a third party entity not illustrated in the system of FIG. 1. The training documents may include documents and associated data types which may be used by the document type predictor (116) to generate prediction models. The training documents may include other and/or additional information without departing from embodiments disclosed herein.

In one or more embodiments, the document collection manager (112) may include the functionality to maintain the document repository (122). As discussed above, the document collection manager (112) may request and obtain documents, including training documents, from clients (100) or other entities and store the documents in the document repository (122). The document collection manager (112) may provide documents and training documents from the document repository (122) to the document augmentation and transformation manager (114) for data extraction prediction generation and prediction model generation. The document collection manager (112) may perform other and/or additional maintenance actions (e.g., removing documents, copying documents, providing documents to clients (100) and/or the document data extraction engine (130), etc.) associated with the document repository (122) without departing from embodiments disclosed herein.

In one or more embodiments, the prediction model repository (124) may include one or more prediction models. The prediction models may be data structures that represent any number of document type prediction models for generating document type predictions. The prediction models may be applied to documents to generate document type predictions specifying the type of data included in a documents. The prediction models may be, for example, a deep learning model generated by applying training documents to a deep learning algorithm. The deep learning algorithm may be any type of deep learning algorithm for generating deep learning models (e.g., deep neural networks, deep reinforcement learning networks, convolutional neural networks, etc.) without departing from embodiments disclosed herein.

While the data structures (e.g., 122, 124) are illustrated as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (120), any of the aforementioned data structures may be stored in different locations (e.g., in storage of other computing devices) and/or spanned across any number of computing devices without departing from embodiments disclosed herein.

In one or more embodiments, the document data extraction engine (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the document data extraction engine (130) described herein and/or all, or a portion, of the methods illustrated in FIGS. 2A-2B. The document data extraction engine (130) may be implemented using other types of computing devices without departing from the embodiments disclosed herein. For additional details regarding computing devices, refer to FIG. 4.

The document data extraction engine (130) may be implemented using logical devices without departing from the embodiments disclosed herein. For example, the document data extraction engine (130) may include virtual machines that utilize computing resources of any number of physical computing devices to provide the functionality of the document data extraction engine (130). The document data extraction engine (130) may be implemented using other types of logical devices without departing from the embodiments disclosed herein.

In one or more embodiments, the document data extraction engine (130) may include the functionality to, or otherwise be configured to, provide data extraction services. The data extraction services may include extracting data from various types of documents as initiated by the document preprocessing engine (110). The data extraction services may further include providing the extracted data and the documents to the clients (100) for further processing and/or to perform computer implemented services using the documents and the extracted data. The document data extraction engine (130) may include the functionality to perform other and/or additional services without departing from embodiments disclosed herein. For additional information regarding the functionality of the document data extraction engine (130), refer to FIGS. 2A-2B.

To perform the data extraction services, the document data extraction engine (130) may include multiple data extraction services. The document data extraction engine may include any quantity of data extraction services without departing from embodiments disclosed herein. For example, the document data extraction engine (130) may include data extraction service A (132A) and data extraction service N (132N). The document data extraction engine (130) may include other, fewer, and/or additional components without departing from embodiments disclosed herein.

In one or more embodiments disclosed herein, a data extraction service (e.g., 132A, 132N) is implemented as physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data extraction service (132A, 132N) described throughout this Detailed Description.

In one or more embodiments disclosed herein, a data extraction service (e.g., 132A, 132N) is implemented as computer instructions, e.g., computer code, stored on a persistent storage that when executed by a processor of the document data extraction engine (130) causes the document data extraction engine (110) to provide the functionality of the data extraction service (e.g., 132A, 132N) described throughout this Detailed Description.

In one or more embodiments, each data extraction service (e.g., 132A, 132N) includes the functionality to, or is otherwise configured to, perform data extraction on documents. Each data extraction service may include the functionality to perform data extraction services for a specific type of document. For example, data extraction service A (132A) includes the functionality to perform data extraction on purchase orders while data extraction service N (132N) includes the functionality to perform data extraction on job applications. The data extraction services (e.g., 132A, 132N) may include the functionality to perform all, or a portion thereof, the steps in the methods depicted in FIGS. 2A-2B.

The data extraction services (e.g., 132A, 132N) may include, or be configured to perform, other and/or additional functionalities without departing from embodiments disclosed herein.

Although the system of FIG. 1 is shown as having a certain number of components (e.g., 100A, 100B, 110, 112, 114, 116, 120, 122, 124, 130, 132A, 132N), in other embodiments disclosed herein, the system may have more or fewer components. For example, the functionality of each component described above may be split across components or combined into a single component (e.g., the functionalities of the document preprocessing engine (110) and the document data extraction engine may be combined to be implanted by a single component). Further still, each component may be utilized multiple times to carry out an iterative operation.

Figure 2A:
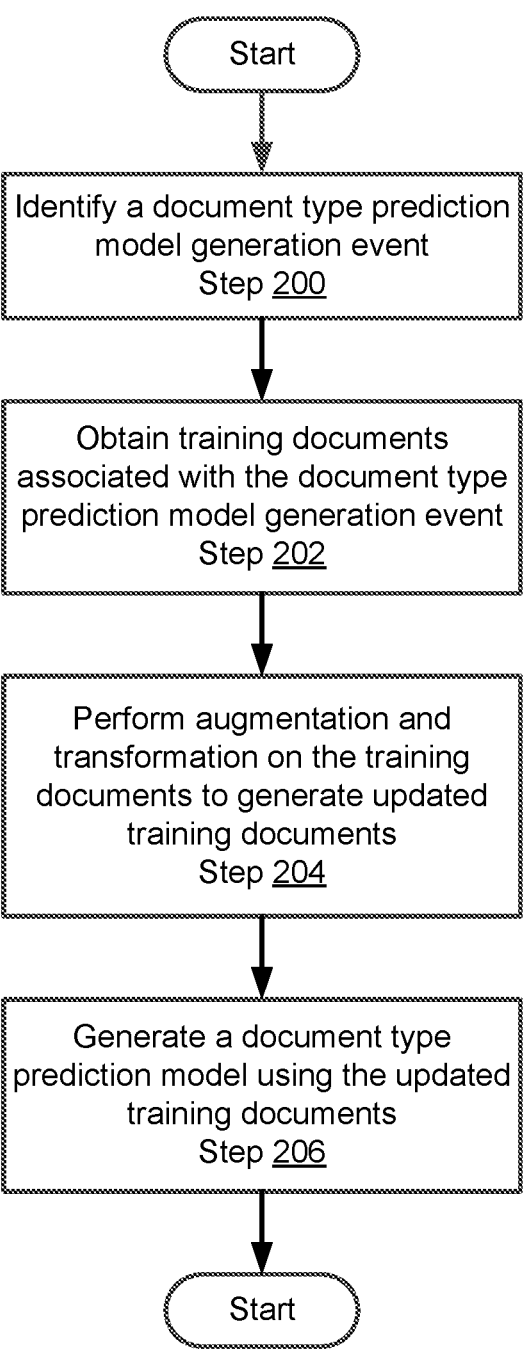
FIGS. 2A-2B show flowcharts of methods in accordance with one or more embodiments disclosed herein.
Figure 2B:
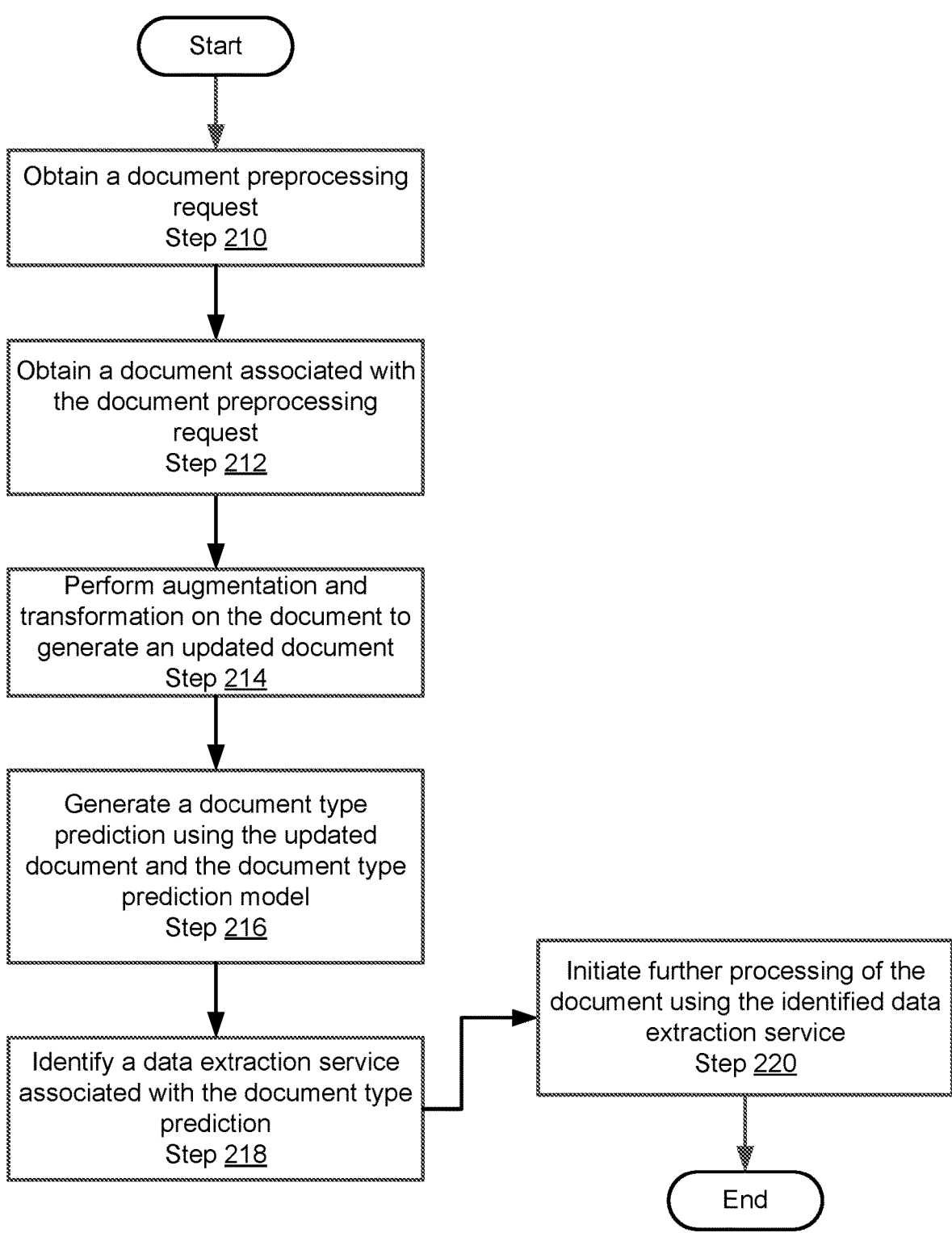

FIGS. 2A-2B show flowcharts in accordance with one or more embodiments disclosed herein. Turning now to FIG. 2A, FIG. 2A shows a flowchart of a method performed to generate a document type prediction model in accordance with one or more embodiments disclosed herein. The method shown in FIG. 2A may be performed, for example, by a combination of the document collection manager (e.g., 112 FIG. 1), the document augmentation and transformation manager (e.g., 114, FIG. 1), and the document type predictor (e.g., 116, FIG. 1). Other components of the system in FIG. 1 may perform all, or a portion, of the method of FIG. 2A without departing from the scope of the embodiments described herein.

While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a document type prediction model generation event is identified. In one or more embodiments, the document type predictor may identify the prediction model generation event. The prediction model generation event may include obtaining a prediction model generation request from a user (e.g., a user of the document preprocessing engine, a user of a client, etc.), the occurrence of a point in time specified by a prediction model generation schedule, etc. The document type predictor may monitor a prediction model update schedule and identify points in time specified by the prediction model generation schedule. The prediction model generation event may be identified via other and/or additional methods without departing from embodiments disclosed herein.

In Step 202, training documents associated with the document type prediction model generation event are obtained. In one or more embodiments, the document collection manager of the document preprocessing engine may first check the document repository for training documents. The document collection manager may, if present, retrieve the training documents from the document repository of the storage of the document preprocessing engine. In one or more embodiments, if there are no, or an insufficient quantity of, training documents included in the document repository, then the document collection manager may send a message that includes a request for training documents to one or more clients. In response to obtaining the request, the one or more clients may generate and/or retrieve the training documents and send the training documents to the document collection manager.

In one or more embodiments, the document collection manager may send a message to the third party entity. The message may include a request for the training document. In response to obtaining the request, the third party entity may generate and/or retrieve the training documents and send the training documents to the document collection manager. The training documents associated with the document type prediction model generation event may be obtained via other and/or additional methods without departing from embodiments disclosed herein.

In Step 204, augmentation and transformation are performed on the training documents to generate updated training documents. The document augmentation and transformation manager may then perform data preparation on the training documents. In one or more embodiments, the document augmentation and transformation manager obtains the training documents from the document collection manager. The document augmentation and transformation manager then performs augmentation on the training documents to generate augmented training documents. Performing augmentation on the training documents may result in the generation of more features associated with the training documents that may be used to train the document type prediction model, resulting in a more robust prediction model. The augmentation performed on the training documents may include, but not be limited to, blurring, rotating, flipping, adding noise to, and shape shifting all, or portions thereof, the training documents.

In addition to the aforementioned augmentation techniques, new training documents may be generated using linear interpolations of training document image tensors. Any quantity of new documents may be generated using linear interpolation of any quantity of training documents without departing from embodiments disclosed herein. Furthermore, augmentation may also include cutting portions of the images of the training documents and pasted amongst the images of the training documents. Moreover, the ground truth labels (i.e., the document type labels) may be distributed proportionally to the cut and pasted portions of the documents. Other and/or additional augmentation techniques may be performed on the training documents to generate augmented training documents without departing from embodiments disclosed herein.

After the training documents are augmented, the document augmentation and transformation manager may then perform transformations on the augmented training documents to generate updated training documents. The transformations may include, but not be limited to, standardizing and normalizing the augmented training documents based on size, color, angle, contrast, etc. The transformations may further include contrast stretching, gray scaling, contouring, thresholding, etc. Other and/or additional augmentation techniques may be performed on the training documents to generate updated training documents without departing from embodiments disclosed herein.

Augmentation and transformation may be performed on the training documents to generate updated training documents via other and/or additional methods without departing from embodiments disclosed herein.

In Step 206, a document type prediction model is generated using the updated training documents. In one or more embodiments, the document predictor may apply the updated training documents to a deep learning prediction algorithm to generate the document type prediction model. The document type prediction model may be a deep convolutional neural network. The deep learning prediction algorithm may be a deep convolutional neural network algorithm. The deep convolutional neural network may include multiple convolutional neural layers, custom series of nonlinear pooling layers, and fully connected layers. Additionally, the hyperparameters (e.g., learning rate, loss function, etc.) may be tuned using a model optimization method to balance between the hyperparameters for optimal model performance. In one or more embodiments, other and/or additional deep learning algorithms (e.g., deep neural networks, deep reinforcement learning networks, convolutional neural networks, etc.) may be used to generate other and/or additional deep learning prediction models without departing from embodiments disclosed herein. The document type prediction model may be generated using the updated training documents via other and/or additional methods without departing from embodiments disclosed herein.

In one or more embodiments disclosed herein, the method ends following Step 218.

Turning now to FIG. 2B, FIG. 2B shows a flowchart of a method performed to generate document type predictions to perform document preprocessing services in accordance with one or more embodiments disclosed herein. The method shown in FIG. 2B may be performed, for example, by a combination of the document collection manager (e.g., 112 FIG. 1), the document augmentation and transformation manager (e.g., 114, FIG. 1), and the document type predictor (e.g., 116, FIG. 1). Other components of the system in FIG. 1 may perform all, or a portion, of the method of FIG. 2B without departing from the scope of the embodiments described herein.

While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 210, a document preprocessing request is obtained. In one or more embodiments, the document collection manager of the document preprocessing engine may obtain a message from a client. A user of the client may generate the message to send to the document collection manager. The message may include a request to generate a document type prediction. The message may include the client identifier that may specify the client associated with the message. The message may also include the document identifier associated with the document data extraction request. The message may also include contact information (e.g., network address, IP address, host address, digital signatures, public key infrastructure information, etc.) associated with a third party entity that includes the document associated with the document data extraction request. The document preprocessing request may be obtained via other and/or additional methods without departing from embodiments disclosed herein.

In Step 202, a document associated with the document preprocessing request is obtained. In one or more embodiments, the document collection manager of the document preprocessing engine uses the document identifier and the client identifier included in the document data extraction request to obtain the document associated with the document data extraction request. The document collection manager may first use the document identifier to check if the corresponding document is already stored in the document repository. If the document associated with the document identifier is stored in the document repository, then the document collection manager may retrieve the document from the document repository. In one or more embodiments, if the document associated with the document identifier is not included in the document repository, then the document collection manager may send a message that includes the document identifier and a request for the document to the client associated with the client identifier. In response to obtaining the request, the client may retrieve the document and send the document to the document collection manager.

In one or more embodiments, for document preprocessing requests that include contact information associated with third party entities that include the document associated with the document data extraction request, the document collection manager may use the contact information to send a message to the third party entity. The contact information may enable the document collection manager to contact and/or otherwise communicate requests and/or data with the third party entity. The message may include a request for the document and the document identifier. In response to obtaining the request, the third party entity may retrieve the document and send the document to the document collection manager. The document associated with the document data extraction request may be obtained via other and/or additional methods without departing from embodiments disclosed herein.

In Step 214, augmentation and transformation are performed on the document to generate an updated document. The document augmentation and transformation manager may then perform data preparation on the document. In one or more embodiments, the document augmentation and transformation manager obtains the document from the document collection manager. The document augmentation and transformation manager may then perform augmentation on the document to generate augmented document. Performing augmentation on the document may result in the generation of more features associated with the document that may be used to generate the document type prediction associated with the document, resulting in a more robust and accurate document type prediction. The augmentation performed on the document may include, but not be limited to, blurring, rotating, flipping, adding noise to, and shape shifting all, or portions thereof, the document. Other and/or additional augmentation techniques may be performed on the document to generate an augmented document without departing from embodiments disclosed herein.

After the document is augmented, the document augmentation and transformation manager may then perform transformations on the augmented document to generate an updated document. The transformations may include, but not be limited to, standardizing and normalizing the augmented document based on size, color, angle, contrast, etc. The transformations may further include contrast stretching, gray scaling, contouring, thresholding, etc. Other and/or additional augmentation techniques may be performed on the document to generate the updated document without departing from embodiments disclosed herein.

Augmentation and transformation may be performed on the document to generate an updated document via other and/or additional methods without departing from embodiments disclosed herein.

In Step 216, a document type prediction is generated using the updated document and the document type prediction model. In one or more embodiments, the document augmentation and transformation manager may provide the updated document to the document type predictor of the document preprocessing engine. The document type predictor may introduce the document into the most recently generated document type prediction model. In other words, the most recently generated prediction model may use the updated document as an input and produce a document type prediction associated with the document. The document type prediction may include an indication (e.g., a document type identifier or a document type tag/flag associated with a particular document type) of the document type associated with the document. For example, for a purchase order, the document type prediction may include a purchase order document type identifier. The document type prediction may be generated using a prediction model and the upgraded document via other and/or additional methods without departing from embodiments disclosed herein.

In Step 218, a data extraction service associated with the document type prediction is identified. In one or more embodiments, the document type predictor may use document type mappings stored in the storage (e.g., 120, not shown in FIG. 1). The document type mappings may include mappings between document type identifiers and corresponding data extraction service identifiers. The document type predictor may match the document type identifier included in or specified by the document type prediction to the corresponding document type identifier included in the document type mappings. The document type predictor may identify the data extraction service corresponding to the data extraction identifier that is mapped to the document type identifier as the data extraction service associated with the document type prediction. The data extraction service associated with the document type prediction may be identified via other and/or additional methods without departing from embodiments disclosed herein.

In Step 220, further processing of the document using the identified data extraction service is initiated. In one or more embodiments, the document type predictor sends a message to the document data extraction engine. The message may include the document, the data extraction service identifier associated with the identified data extraction service, and a request to perform data extraction using the identified data extraction service. In response to obtaining the message, the document data extraction engine performs data extraction on the document using the identified data extraction service. The document data extraction engine may then send the document and the extracted data to the client associated with the document for further processing and/or to perform computer implemented services. Further processing of the document using the identified data extraction service may be initiated via other and/or additional methods without departing from embodiments disclosed herein.

In one or more embodiments disclosed herein, the method ends following Step 220.

Figure 3A:
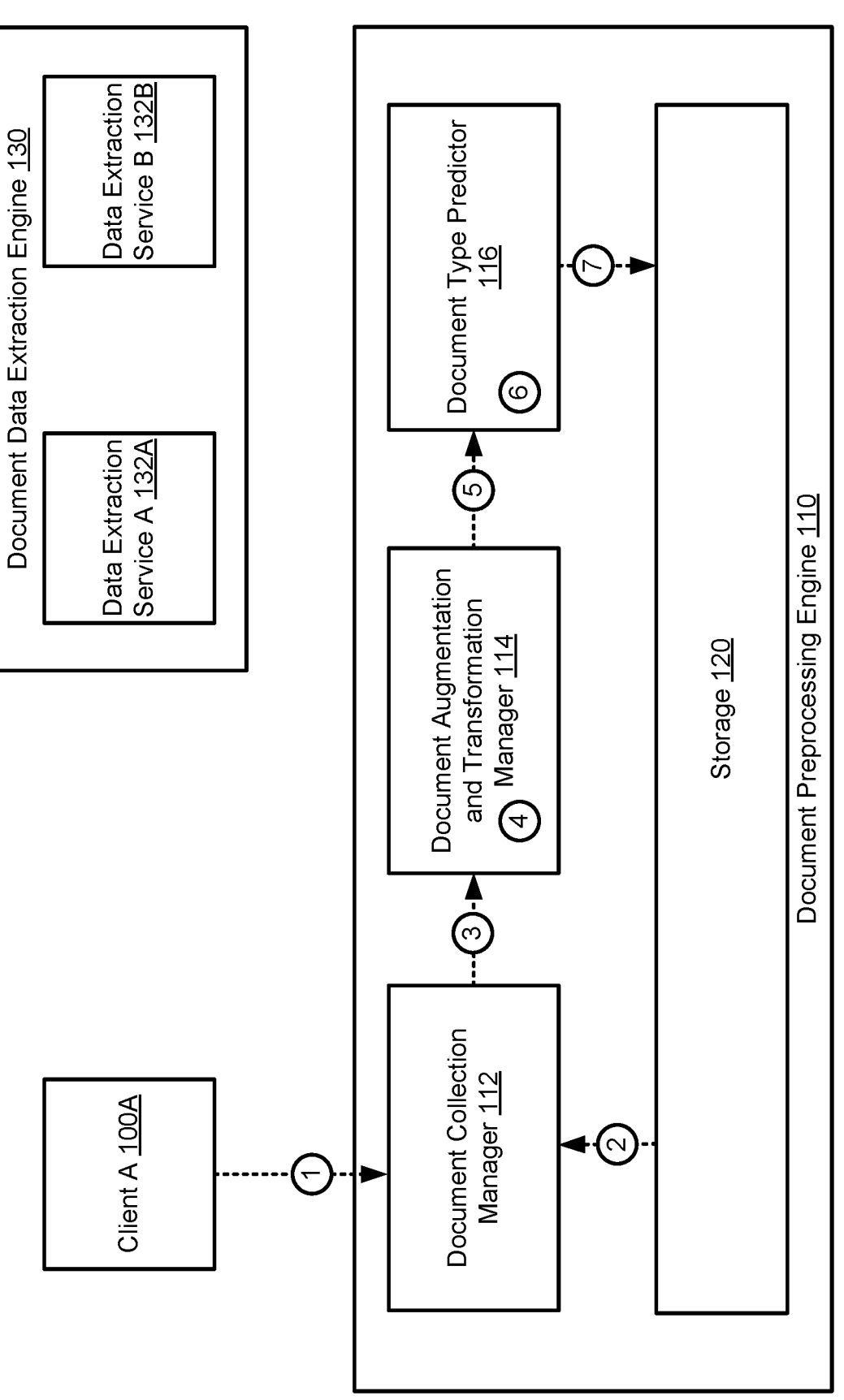
FIGS. 3A-3B show a diagrams of examples in accordance with one or more embodiments disclosed herein.
Figure 3B:
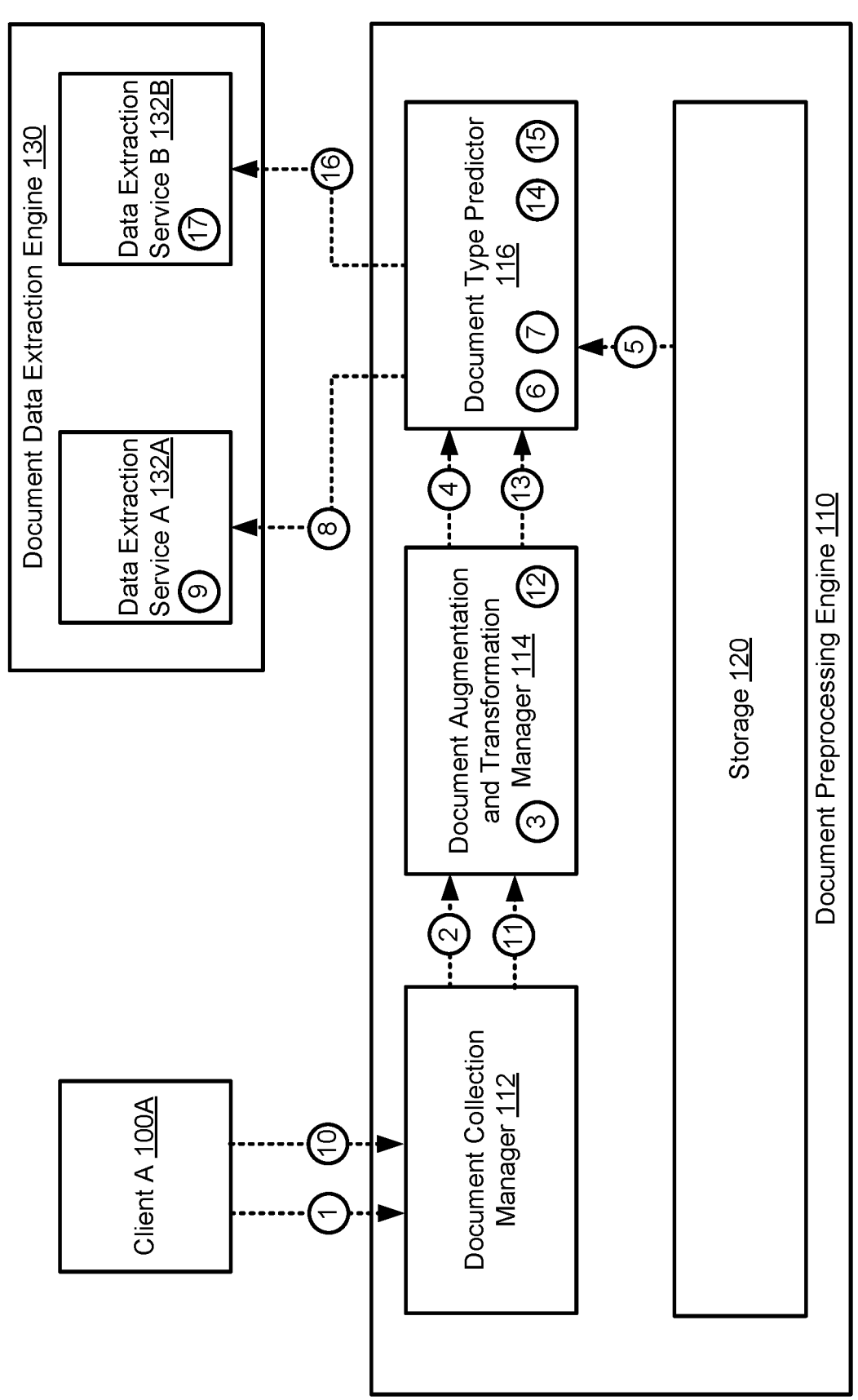

To further clarify aspects of embodiments disclosed herein, non-limiting examples are provided in FIGS. 3A-3B. FIGS. 3A-3B show diagrams of an example system and actions that may be performed by the example systems over time. The example systems of FIGS. 3A-3B may be similar to that of FIG. 1. For the sake of brevity, only a limited number of components of the system of FIG. 1 are illustrated in FIGS. 3A-3B.

Examples

Starting with FIG. 3A, FIG. 3A shows a diagram of a first example in accordance with one or more embodiments disclosed herein. The first example may include generating a document data type prediction model.

Consider a scenario as illustrated in FIG. 3A in which a data preprocessing engine (110) is providing document preprocessing services for client A (100A), and a document data extraction engine (130) is providing data extraction services for client A (100A). To perform the document preprocessing services, the document preprocessing engine includes a document collection manager (112), a document augmentation and transformation manager (114), a document type predictor (116), and storage (120). To perform the data extraction services, the document data extraction engine (130) includes data extraction service A (132A) and data extraction service B (132B). Client A (100A) performs purchase order processing services. To perform the purchase order processing services, Client A (100A) requires data to be extracted from two types of documents, purchase orders and electronic mail communications. Data extraction service A (132A) is configured to perform data extraction services for purchase orders and data extraction service B (132B) is configured to perform data extraction services for electronic mail communications.

At a first point in time, client A (100A) sends a document type prediction model generation request to the document collection manager (112) [1]. In response to obtaining the document type prediction model generation request, the document collection manager (112) obtains previously stored training documents from a document repository (not shown in FIG. 3A) of the storage (120) [2]. The training documents were obtained from a third party entity not shown in FIG. 3A. After obtaining the training documents, the document collection manager (112) then provides the training documents to the document augmentation and transformation manager (114) [3].

In response to obtaining the training documents, the document augmentation and transformation manager (114) performs augmentations and transformations on the training documents to generate updated training documents [4]. Next, the document augmentation and transformation manager (114) provides the updated training documents to the document type predictor (116) [5]. The document type predictor (116) then applies a deep convolutional neural network algorithm to the updated training documents to generate a document type prediction model [6]. The document type predictor (116) then stores the document type prediction model in storage (120) [7], where the document type prediction model may be retrieved to generate subsequent document type predictions.

Turning to FIG. 3B, FIG. 3B shows a diagram of a second example in accordance with one or more embodiments disclosed herein. The second example may include generating document type predictions to perform document preprocessing services.

Consider a scenario as illustrated in FIG. 3B in which a data preprocessing engine (110) is providing document preprocessing services for client A (100A), and a document data extraction engine (130) is providing data extraction services for client A (100A). To perform the document preprocessing services, the document preprocessing engine includes a document collection manager (112), a document augmentation and transformation manager (114), a document type predictor (116), and storage (120). To perform the data extraction services, the document data extraction engine (130) includes data extraction service A (132A) and data extraction service B (132B). Client A (100A) performs purchase order processing services. To perform the purchase order processing services, Client A (100A) requires data to be extracted from two types of documents, purchase orders and electronic mail communications. Data extraction service A (132A) is configured to perform data extraction services for purchase orders and data extraction service B (132B) is configured to perform data extraction services for electronic mail communications.

At a first point in time, client A (100A) sends a message to the document collection manager (112) [1]. The message includes a document preprocessing request to generate a document type prediction associated with a document. The message further includes the document. In response to obtaining the message, the document collection manager (112) provides the document to the document augmentation and transformation manager (114) [2]. The document augmentation and transformation manager (114) then performs augmentations and transformations on the document to generate an updated document [3]. After that, the document augmentation and transformation manager (114) provides the updated document to the document type predictor (116) [4].

In response to obtaining the updated document, the document type predictor (116) retrieves the document type prediction model from the storage (120) [5]. The document type predictor (116) then applies the document type prediction model to the updated document to generate a document type prediction [6]. The document type prediction specifies that the document is predicted to be a purchase order. The document type predictor (116) then uses document type mappings to identify that data extraction service A (132A) corresponds with purchase orders [7]. The document type predictor (116) then provides the document to data extraction service A (132A) and initiates the performance of data extraction services for the document [8]. Data extraction service A (132A) then extracts the purchase order data from the document and provides the document and the purchase order data to client A (100A) for further processing and to perform computer implemented services [9].

After obtaining the purchase order data and the purchase order document, client A (100A) sends a second message to the document collection manager (112) [10]. The second message includes a document preprocessing request to generate a document type prediction associated with a document. The message further includes a second document. In response to obtaining the message, the document collection manager (112) provides the second document to the document augmentation and transformation manager (114) [11]. The document augmentation and transformation manager (114) then performs augmentations and transformations on the second document to generate a second updated document [12]. After that, the document augmentation and transformation manager (114) provides the second updated document to the document type predictor (116) [13].

In response to obtaining the second updated document, the document type predictor (116) applies the document type prediction model to the second updated document to generate a second document type prediction [14]. The second document type prediction specifies that the second document is predicted to be an electronic communication document. The document type predictor (116) then uses document type mappings to identify that data extraction service B (132B) corresponds with electronic communications [15]. The document type predictor (116) then provides the second document to data extraction service B (132B) and initiates the performance of data extraction services for the second document [16]. Data extraction service B (132B) then extracts the electronic communication data from the second document and provides the second document and the electronic communication data to client A (100A) for further processing and to perform computer implemented services [17].

End of Examples

Figure 4:
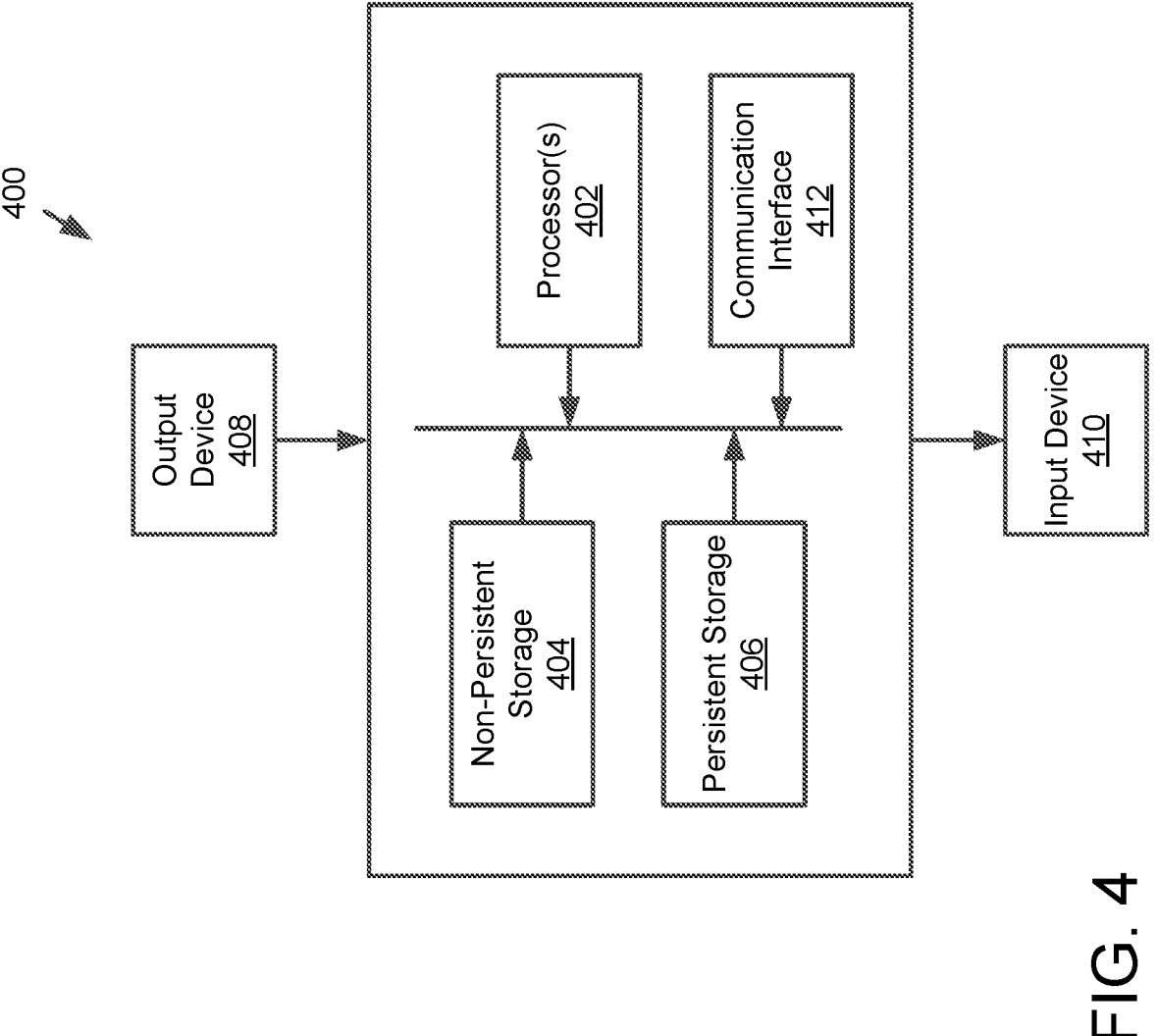
FIG. 4 shows a diagram of a computing device in accordance with one or more embodiments disclosed herein.

Embodiments disclosed herein may be implemented using computing devices and/or computing systems. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

The problems discussed throughout this disclosure should be understood as being examples of problems solved by embodiments disclosed herein and the embodiments disclosed herein should not be limited to solving the same/similar problems. The disclosed embodiments are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing preprocessing of documents for data extraction, comprising:

identifying a document type prediction model generation event;

in response to identifying the document type prediction model generation event:

obtaining training documents associated with the document type prediction model generation event;

performing data preparation on the training documents to generate updated training documents, wherein the updated training documents comprise augmented training documents and new training documents, wherein:

generating the augmented training documents comprises performing blurring, rotating, flipping, adding noise to, or shape shifting to the training documents, and generating the new training documents comprises using linear interpolations of training document image tensors between at least two different document image tensor representations of corresponding ones of the training documents;

generating the document type prediction model using the updated training documents;

after the generating, obtaining a document preprocessing request;

in response to obtaining a document preprocessing request:

obtaining a document associated with the document preprocessing request;

performing data preparation on the document to generate an updated document;

generating a document type prediction using the updated document and a document type prediction model;

identifying a data extraction service of a plurality of data extraction services associated with the document type prediction; and initiating further processing of the document to perform data extraction using the identified data extraction service.

2. The method of claim 1, further comprising:

after initiating the further processing of the document using the identified data extraction service:

obtaining a second document associated with the document preprocessing request;

performing data preparation on the second document to generate a second updated document;

generating a second document type prediction using the second updating document and the document type prediction model;

identifying a second data extraction service of the plurality of data extraction services associated with the second document type prediction; and initiating further processing of the second document using the second identified data extraction service.

3. The method of claim 2, wherein the document type prediction specifies a first document type and the second document type prediction specifies a second document type.

4. The method of claim 3, wherein:

the data extraction service is configured to perform data extraction for documents of the first document type; and the second data extraction service is configured to perform data extraction for documents of the second document type.

5. The method of claim 1, wherein performing data preparation on the document to generate the updated document comprises:

performing augmentations on the document; and performing transformations on the document.

6. The method of claim 1, wherein performing data preparation on the training documents to generate the updated training documents comprises:

performing augmentations on the training documents; and performing transformations on the training documents.

7. A non-transitory computer readable medium comprising computer readable program code, which when executed by a computer processor enables the computer processor to perform a method for performing preprocessing of documents for data extraction, the method comprising:

identifying a document type prediction model generation event;

in response to identifying the document type prediction model generation event:

obtaining training documents associated with the document type prediction model generation event;

performing data preparation on the training documents to generate updated training documents, wherein the updated training documents comprise augmented training documents and new training documents, wherein:

generating the augmented training documents comprises performing blurring, rotating, flipping, adding noise to, or shape shifting to the training documents, and generating the new training documents comprises using linear interpolations of training document image tensors between at least two different document image tensor representations of corresponding ones of the training documents;

generating the document type prediction model using the updated training documents;

after the generating, obtaining a document preprocessing request;

in response to obtaining a document preprocessing request:

obtaining a document associated with the document preprocessing request;

performing data preparation on the document to generate an updated document;

generating a document type prediction using the updated document and a document type prediction model;

identifying a data extraction service of a plurality of data extraction services associated with the document type prediction; and initiating further processing of the document to perform data extraction using the identified data extraction service.

8. The non-transitory computer readable medium of claim 7, further comprising:

after initiating the further processing of the document using the identified data extraction service:

obtaining a second document associated with the document preprocessing request;

performing data preparation on the second document to generate a second updated document;

generating a second document type prediction using the second updating document and the document type prediction model;

identifying a second data extraction service of the plurality of data extraction services associated with the second document type prediction; and initiating further processing of the second document using the second identified data extraction service.

9. The non-transitory computer readable medium of claim 8, wherein the document type prediction specifies a first document type and the second document type prediction specifies a second document type.

10. The non-transitory computer readable medium of claim 9 wherein:

the data extraction service is configured to perform data extraction for documents of the first document type; and the second data extraction service is configured to perform data extraction for documents of the second document type.

11. The non-transitory computer readable medium of claim 7, wherein performing data preparation on the document to generate the updated document comprises:

performing augmentations on the document; and performing transformations on the document.

12. The non-transitory computer readable medium of claim 7, wherein performing data preparation on the training documents to generate the updated training documents comprises:

performing augmentations on the training documents; and performing transformations on the training documents.

13. A system for performing data extraction for documents comprises:

a plurality of clients; and a document preprocessing engine configured to:

identify a document type prediction model generation event;

in response to identifying the document type prediction model generation event:

obtain training documents associated with the document type prediction model generation event;

perform data preparation on the training documents to generate updated training documents, wherein the updated training documents comprise augmented training documents and new training documents, wherein:

generating the augmented training documents comprises performing blurring, rotating, flipping, adding noise to, or shape shifting to the training documents, and generating the new training documents comprises using linear interpolations of training document image tensors between at least two different document image tensor representations of corresponding ones of the training documents;

generate the document type prediction model using the updated training documents;

after the generating, obtain a document preprocessing request from a client of the plurality of clients;

in response to obtaining a document preprocessing request:

obtain a document associated with the document preprocessing request;

perform data preparation on the document to generate an updated document;

generate a document type prediction using the updated document and a document type prediction model;

identify a data extraction service of a plurality of data extraction services associated with the document type prediction; and initiate further processing of the document to perform data extraction using the identified data extraction service.

14. The system of claim 13, wherein the document preprocessing engine is further configured to:

after initiating the further processing of the document using the identified data extraction service:

obtain a second document associated with the document preprocessing request;

perform data preparation on the second document to generate a second updated document;

generate a second document type prediction using the second updating document and the document type prediction model;

identify a second data extraction service of the plurality of data extraction services associated with the second document type prediction; and initiate further processing of the second document using the second identified data extraction service.

15. The system of claim 14, wherein the document type prediction specifies a first document type and the second document type prediction specifies a second document type.

16. The system of claim 15, wherein:

the data extraction service is configured to perform data extraction for documents of the first document type; and the second data extraction service is configured to perform data extraction for documents of the second document type.

17. The system of claim 13, wherein performing data preparation on the document to generate the updated document comprises:

performing augmentations on the document; and performing transformations on the document.

* * * * *